US008848610B2

(12) United States Patent
Miklós et al.

(10) Patent No.: US 8,848,610 B2
(45) Date of Patent: Sep. 30, 2014

(54) LIGHTWEIGHT DATA TRANSMISSION MECHANISM

(75) Inventors: György Miklós, Pilisborosjenö (HU); Zoltán Richárd Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 13/264,496

(22) PCT Filed: Jun. 10, 2011

(86) PCT No.: PCT/EP2011/059664
§ 371 (c)(1),
(2), (4) Date: Oct. 14, 2011

(87) PCT Pub. No.: WO2012/048915
PCT Pub. Date: Apr. 19, 2012

(65) Prior Publication Data
US 2012/0213165 A1    Aug. 23, 2012

Related U.S. Application Data

(60) Provisional application No. 61/393,430, filed on Oct. 15, 2010.

(51) Int. Cl.
*H04L 12/28* (2006.01)
*H04W 12/06* (2009.01)
*H04W 4/00* (2009.01)

(52) U.S. Cl.
CPC .............. *H04W 12/06* (2013.01); *H04W 4/005* (2013.01)
USPC .............................. 370/328; 370/395.2; 726/4

(58) Field of Classification Search
None
See application file for complete search history.

(56) References Cited

U.S. PATENT DOCUMENTS 8,706,148 B2 *  4/2014  Pudney et al. ................ 455/466
2008/0198861 A1 *  8/2008  Makela ......................... 370/401
(Continued)

FOREIGN PATENT DOCUMENTS

| WO | WO 2009/056932 |   | 5/2009 |
| WO | WO2009/056932 | * | 5/2009 |
| WO | WO 2010/111429 |   | 9/2010 |

OTHER PUBLICATIONS

International Search Report and Written Opinion mailed Oct. 21, 2011 in corresponding Application No. PCT/EP2011/059664.

(Continued)

*Primary Examiner* — Christine Duong
(74) *Attorney, Agent, or Firm* — Nixon & Vanderhye P.C.

(57) ABSTRACT

User plane data is sent between a user device and a network entity within a packet core network via a radio access network. The user device is authenticated to the network entity, and a Security Association between the user device and the network entity is established. The user device is maintained in a connectionless state such that no Security Association is established between the user device and the radio access network, and no data bearer is set up between the user device and said packet core network. With the user device in the connectionless state, uplink and downlink user plane data is sent between the user device and the network entity by including the data within signalling messages on a Non Access Stratum plane.

22 Claims, 11 Drawing Sheets

(56) References Cited

U.S. PATENT DOCUMENTS

| | | | |
|---|---|---|---|
| 2008/0214193 A1* | 9/2008 | Jeong et al. | 455/436 |
| 2009/0016280 A1* | 1/2009 | Iyer et al. | 370/329 |
| 2011/0085497 A1* | 4/2011 | Fang et al. | 370/328 |

OTHER PUBLICATIONS

Chen et al., "Cellular Based Machine to Machine Communication with Un-Peet2Peer Protocol Stack", Vehicular Technology Conference Fall (VTC-Fall), 2009 IEEE 70$^{th}$ IEEE, Sep. 20, 2009, pp. 1-5, XP031600307.

3GPP; Technical Specification Group Services and System Aspects; Circuit Switched (CS) Fallback in Evolved Packet System (EPS); Stage 2 (Release 10), No. V10.1.0, Sep. 29, 2010, pp. 1-78, XP050442328, pp. 41-45.

Mexican Official Action (with English Summary) dated Jan. 24, 2014 in Mexican Patent Application No. MX/a/2013/003958.

\* cited by examiner

LIGHTWEIGHT DATA TRANSMISSION MECHANISM

This application is the U.S. national phase of International Application No. PCT/EP2011/059664 filed 10 Jun. 2011 which designated the U.S. and claims the benefit of U.S. Provisional Application Ser. No. US 61/393,430 filed 15 Oct. 2010, the entire contents of each of which are hereby incorporated by reference.

TECHNICAL FIELD

The present invention relates to a lightweight data transmission mechanism for transmitting data between a client device and a core network via a radio access network. The invention is applicable in particular, though not necessarily, to machine-to-machine applications where relatively small volumes of data are exchanged between client devices and the core network.

BACKGROUND

In the coming years it is expected that there will be a rapid growth in so-called machine-to-machine (M2M) applications that use cellular network infrastructure. Such applications involve devices (referred to below as Machine Devices or MDs) such as sensors and actuators communicating with other devices or network servers, often without direct human operation. An example application might involve domestic electricity meters configured to periodically transmit electricity consumption readings to a server owned by the utility company supplying electricity. M2M application are expected to massively increase the number of wirelessly connected devices in use with cellular networks. Telefoneaktiebolaget L M Ericsson has predicted 50 billion such devices by the year 2020.

A feature that distinguishes M2M applications from conventional cellular network services is the relatively small amounts of data traffic associated with the former. An electricity meter reading application might, for example, require only the sending of a few bytes of data each month. Nonetheless, given the huge number of MDs that are expected to be in use, the total volume of traffic and associated signalling that will be added to networks will be very great. The existing data transfer and signalling mechanisms implemented within existing mobile data communication systems are not necessarily well suited to M2M applications as these are optimized for high speed and low delay in order to satisfy the needs of Internet users and for applications such as web browsing, email, chat and multimedia.

Mobile communication systems are currently designed such that signaling and user data are generally carried separately. For example, in the case of the 3GPP Long Term Evolution (LTE) and Evolved Packet Core (EPC) architectures, the Mobility Management Entity (MME) entity in the packet core network is responsible for controlling communication with the MD, whilst the Serving Gateway (SGW) entity is responsible for user plane data transfer to and from the eNodeBs (base stations). The following steps must take place before data can be exchanged between a MD and a base station:

Attach: The MD attaches to a network signaling entity, e.g. the MME in the EPC network. This includes security procedures that result in a security context being established in the MD and in the network signaling entity.

Address assignment: The MD performs signaling to acquire a necessary addresses (e.g., IP address or other L2 addressing scheme) to enable data communication.

Go to connected state: The MD connects to the radio access network (RAN), and the network establishes the data path (bearers) and the user context in the RAN node, which also includes a security context.

In the case of M2M applications, it will be appreciated that the relative overhead resulting from these required set up procedures will be very high. This is illustrated by the signalling flow of FIG. 1 for the LTE case, where a MD needs to exchange a few bytes of uplink data followed by a few bytes of downlink data, following which (a timeout) the MD returns to idle mode. FIG. 1 assumes that the "Attach" and "address assignment" procedures have been carried out, and illustrates only those steps associated with the "Go to connected state procedure". Of the steps illustrated in FIG. 1, only steps 13 to 16 in the signalling flow carry actual user data whilst the rest of the procedure represents a communication overhead. Not only does the communication overhead result in increased network load and therefore infrastructure and network support costs, it also causes extra power drain in the MD, reducing the battery lifetime which is a very important factor for MDs such as small sensors.

3GPP TS 23.272 describes a mechanism for delivering Short Message Service (SMS) messages over NAS signalling. Each SMS message is acknowledged by the core network with an integrity protected acknowledgement. However, the approach described in TS 23.272 again requires that the user device establish a connected state with the associated high signalling volume, and is unsuitable for widely used M2M services.

SUMMARY

It is an object of the present invention to reduce the overhead associated with sending data, and in particular small volumes of data, between a user device such as a Machine Device and a network entity.

According to a first aspect of the present invention there is provided a method of sending user plane data between a user device and a network entity within a packet core network via a radio access network. The method comprises 1) authenticating the user device to the network entity and establishing a Security Association between the user device and the network entity;
2) maintaining the user device in a connectionless state, such that no Security Association is established between the user device and the radio access network and no data bearer is set up between the user device and said packet core network;
3) with the user device in said connectionless state, sending uplink and downlink user plane data between the user device and said network entity by including the data within signalling messages on the Non Access Stratum.

According to a second aspect of the present invention there is provided a user device for exchanging data with a network entity within a packet core network via a radio access network. The user device comprises an authentication entity for authenticating the user device to the network entity and for establishing a Security Association with the network entity. The device further comprises a device state manager for maintaining the user device in a connectionless state, such that no Security Association is established between the user device and the radio access network and no data bearer is set up between the user device and said packet core network, and a transceiver for exchanging uplink and downlink user plane data with said network entity when the user device is in said connectionless state by sending and receiving the data within signalling messages on the Non Access Stratum.

According to a third aspect of the present invention there is provided a network entity for use within a packet core network and being configured to exchange data with a user device via a radio access network. The network entity comprises an authentication entity for authenticating the user device and for establishing a Security Association with the user device, and a device state manager for maintaining the user device in a connectionless state, such that no Security Association is established between the user device and the radio access network and no data bearer is set up between the user device and said packet core network. The network entity further comprises a transceiver for exchanging uplink and downlink user plane data with said user device when the user device is in said connectionless state by sending and receiving the data within signalling messages on the Non Access Stratum.

DETAILED DESCRIPTION

Figure 1:
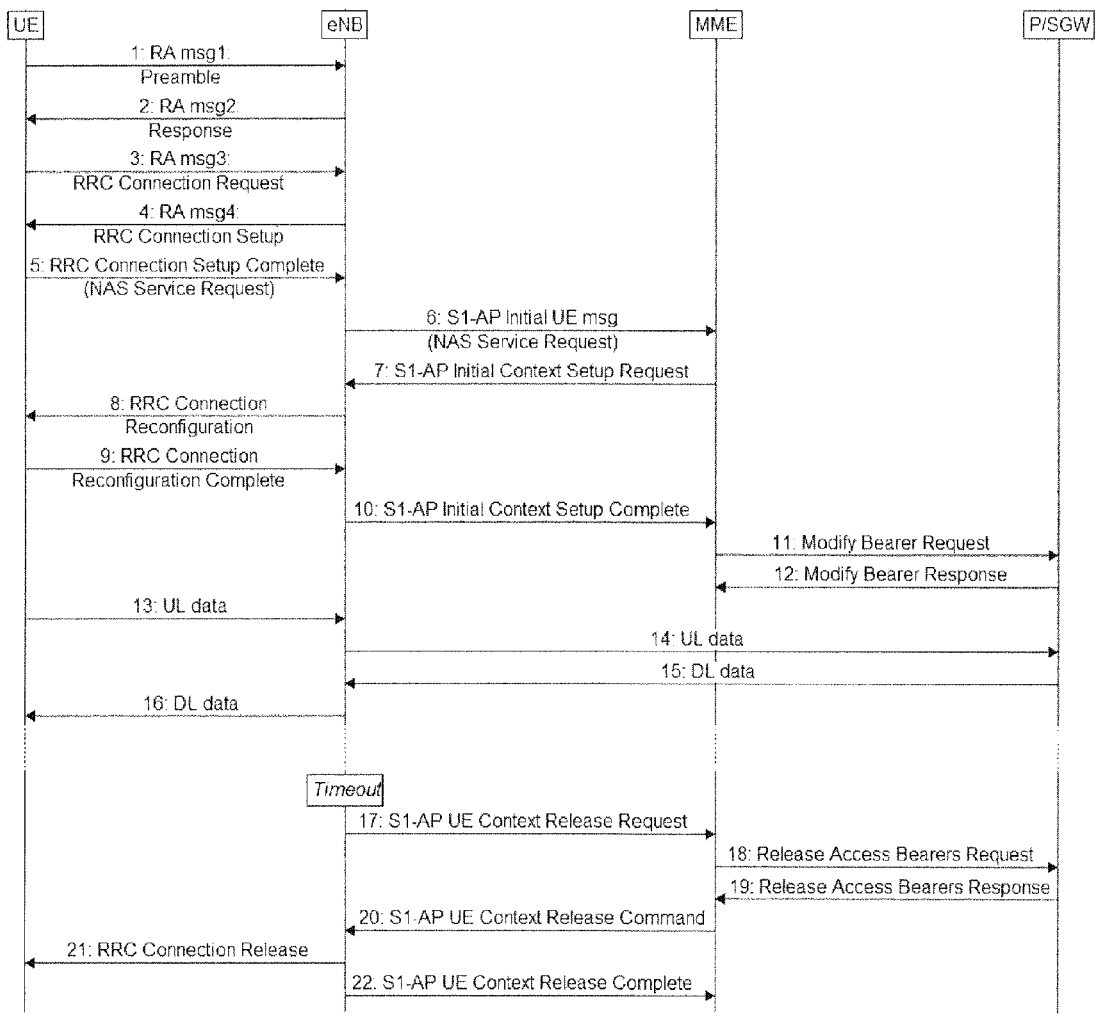
FIG. 1 shows a signalling flow associated with a known approach to exchanging data between a user terminal (UE) and a network entity within a core network.

The particular problems that are likely to arise from a massive number of machine-to-machine (M2M) devices (MDs) communicating with a wireless cellular network have been discussed above, and in particular those arising from the relatively high signalling overhead. It is proposed here to mitigate these problems by enabling MDs to exchange user plane data with a core network, via a base station (where that term encompasses the base stations of LTE enhanced UTRAN architectures as well as equivalents such as the Base Station Controllers and Radio Network Controllers of 2G and 3G networks respectively), without having to first establish a connected state. (The term "user plane data" is intended to refer to data generated at the application layer(s) within the device or at a network or peer node, i.e. data that is not associated with network connections and services.) This means that a device can send data via a Radio Access Network (RAN) without a priori signaling to set up a state in the RAN. This can be achieved by sending uplink and downlink traffic together with routing information. The data may be protected by a security association pre-established between the device and a Network Entity (NE) within the core network. There is no requirement to establish a Security Association (SA) between the device and the base station.

The approach proposed here is in contrast to the SMS-based approach of 3GPP TS 23.272, according to which (see Section 8.2.2) a device starts in the idle mode and performs a Service request in order to establish data bearers. The actual SMS is sent in a Non-Access Stratum (NAS) message only after the Service request has completed. The reason for performing the Service request is that it enables subsequent downlink messaging to the device. The downlink messages are, firstly, an acknowledgement for the SMS itself and subsequently a delivery notification to the MD. By performing a Service request, the MD becomes connected to the RAN such that MD mobility is network controlled: the network orders the MD to perform radio measurements which are sent to the base station, allowing the base station to trigger a handover when necessary. If the Service request were not to be performed, the network would not be able to directly reach the MD in order to send the downlink messages (the MD may have moved between the sending of uplink data and the sending of downlink data), and such sending would require a paging of the MD.

According to the present proposal, the MD is allowed to stay in a state similar to the current idle mode, in the sense that mobility is terminal controlled rather than network controlled (i.e., the MD may decide to move to another base station whenever it decides that another base station has better radio characteristics). The network can still reach the MD for downlink communication in one of the following ways:

For MDs with applications that are not delay sensitive, the downlink data can be buffered in the network until the MD sends some data in the uplink, whereupon the downlink data can be delivered immediately.

For MDs with applications that are more delay sensitive, the downlink data can be sent to the last known location (base station) of the MD. When delivery is unsuccessful due to MD mobility, the network may page the MD, or the network may wait for the MD to send something in the uplink. To reduce delays, the MD may assist the network by sending uplink location information following a handover.

Two key differences between the present proposal and the state of the art (as represented by 3GPP TS 23.272) are therefore that the former:

avoids the setting up of data bearers in the network and in the radio interface; and allows the MD to control mobility, so that the MD can decide on its own to move to a new base station.

Figure 2:
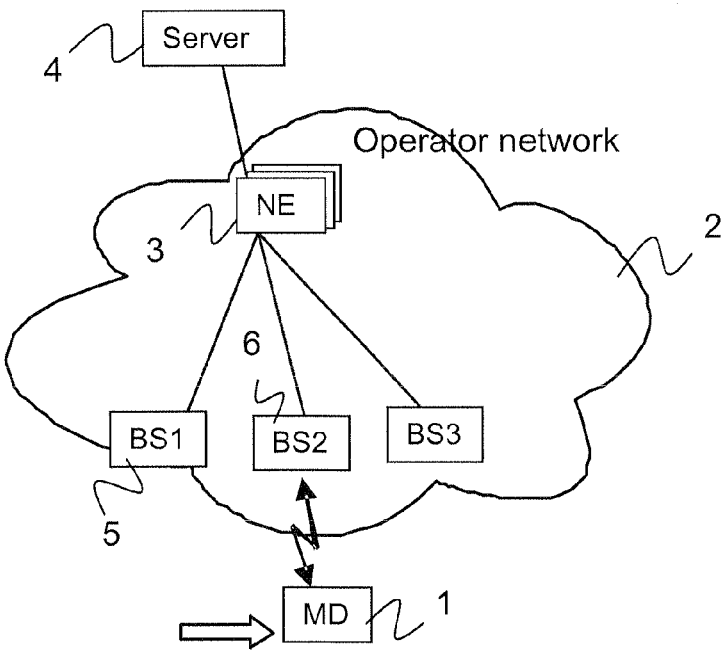
FIG. 2 illustrates schematically a cellular network architecture used for M2M applications.

As a specific example of the present proposal, consider the M2M application scenario depicted in FIG. 2. Here, a Machine Device (MD), such as a sensor, actuator, etc.) and identified by reference numeral 1 comprises a radio interface allowing it to communicate with a RAN of a cellular network 2 such as a 3G or LTE network. Traffic is routed via a Base Station 6 within the RAN. In the case of a LTE network, this BS 6 is an enhanced NodeB (eNB). Within the cellular network 2, a core network entity or node (NE) 3 handles the Non Access Stratum (NAS) for the MD 1. The NE may be realized as a new network node or as a new logical function in an existing node and is responsible for handling both the signaling with the MD as well as the user data. [3GPP TS 21.905 defines the NAS as protocols between the UE and the core network that are not terminated in the UTRAN. However, the definition is not limiting, as the term is applicable to network architectures having different radio access network technologies, e.g. the E-UTRAN of LTE.] In particular, the NE 3 is responsible for mobility management, and the MD 1 has a security association with the network entity NE. In a 3G network, the NE 3 may be a Serving GPRS Support Node (SGSN), whilst in a LTE network the NE 3 may be a Mobility Management Entity (MME). An application server 4 hosts the M2M service and communicates with the NE 3, for example, by way of an IP backbone of the cellular network operator and/or via the Internet. Of course, other network nodes may be present with the data and signalling paths but these are not discussed further here.

Figure 3:
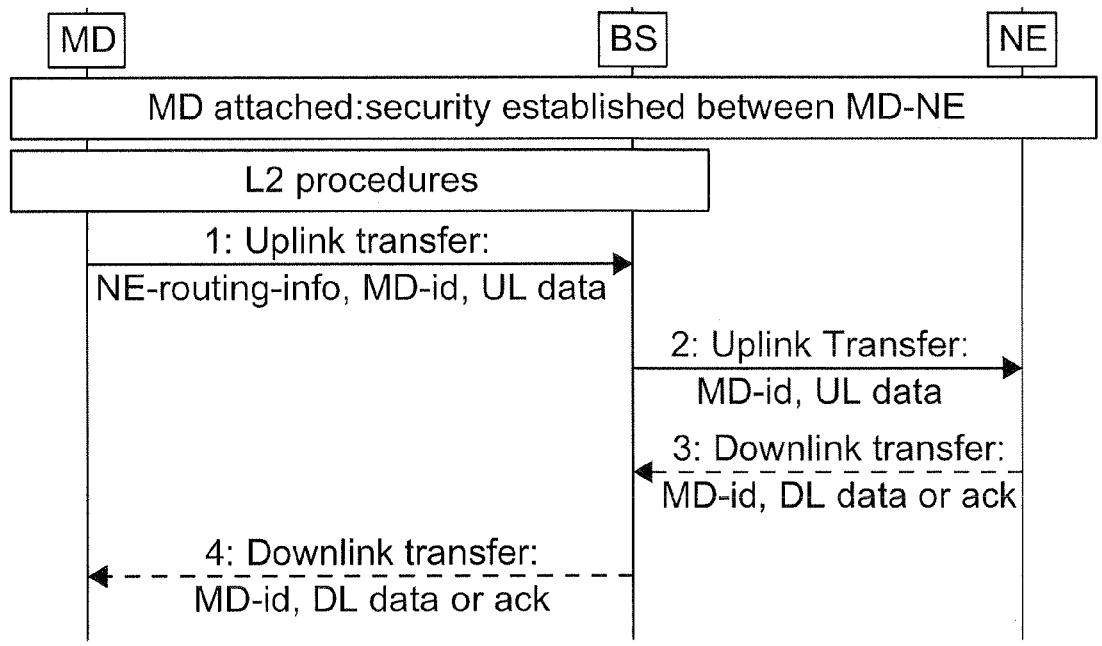
FIG. 3 is a simplified signalling procedure for enabling a connectionless exchange of data between a Machine Device (MD) and a Network Entity (NE) with a packet core network.

FIG. 3 illustrates at a high level a lightweight mechanism for exchanging data between the MD and the NE. The following phases are included within the illustrated mechanism:

Phase 1—Initially, the MD is assumed to authenticate itself towards the network and, as a result, a Security Association (SA) is established between the MD and the NE. This is performed according to state-of-the art methods, e.g. as defined for LTE in 3GPP TS 23.401. This process is illustrated in more detail in FIG. 4 for the specific case of a LTE network, where the MDE (Machine Device Entity) corresponds to the NE discussed above, MDA (Machine Device Authenticator) can be considered as the counterpart of the HSS in the EPC, and the MDGW (Machine Device Gateway) can be considered as the counterpart to the PDN GW in the EPC. The phase 1 procedure is assumed to run rarely, i.e., when the MD is switched on. A successful Attach procedure causes a transition from DETACHED state to ATTACHED state. The MD is assumed to stay in ATTACHED state for a long time. This procedure establishes the context in the NE, and also in the BS that is used for communication.

Phase 2—This involves the layer 2 procedures (such as random access) in order to obtain transmission resource at the selected BS. Address assignment may take place (which may also involve assignment of a GW). Again, this can take place according to state-of-the-art methods, e.g. as defined for LTE in 3GPP TS 23.401.

Phase 3—The sending of uplink and downlink data between the MD and the NE via the BS.

Figure 4:
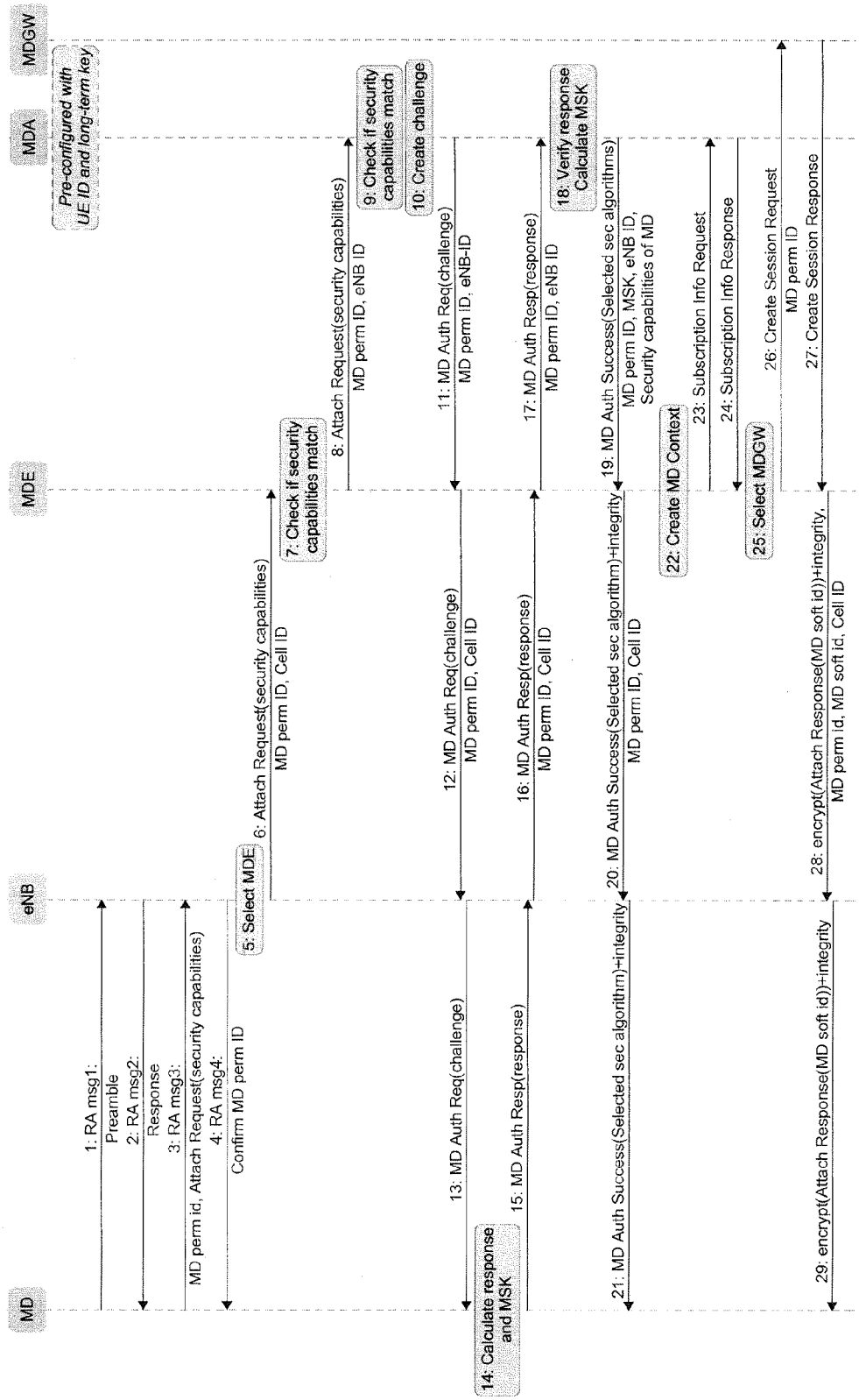
FIG. 4 is a signalling flow for authenticating a Machine Device (MD) to a Network Entity (NE) within a packet core network and for establishing a Security Association (SA) between these two nodes.

In the example of FIG. 4, it should be noted that the MD is initially identified by way of a permanent MD-id, identified as "MD perm ID". This ID may be allocated by a network operator and serves a purpose similar to the cellular IMEI identity and to a MAC address. During the phase 1 procedure, the NE (MDE) allocates a temporary MD-id to the MD, identified as "MD soft ID". This temporary ID may be refreshed periodically and or at a subsequent power down and power up of the MD. The soft ID may comprise a part identifying the NE and a part identifying the MD. The use of a temporary ID may, for example, improve privacy for users.

When the MD has data to send (phase 3), e.g. an IP packet destined for the M2M application server (FIG. 2), it sends this together with an identifier of the MD-id as well as with an identifier of the NE to which the message should be forwarded in case there are multiple NEs. The NE-routing-info is assigned when the MD attaches to the network whilst the MD-id is either permanent or also assigned during attachment. The UL data should be security protected between the MD and the NE, e.g. encrypted when encryption is applicable. Also, UL data should be integrity protected to prevent tampering with the data at intermediate nodes. Integrity protection should also cover the MD-id. However, neither the MD-id nor the NE-routing info should be encrypted in order to allow it to be inspected by the BS and to allow the NE to determine which user the message comes from.

Based on the NE-routing-info, the BS determines which NE to forward the message to, and then sends the uplink data together with the MD-id to that NE. Tunnelling is used to route the data between the BS and the NE, with the BS encapsulating data packets with an outer header including the IP address of the NE as destination address. The NE may then send downlink data to the MD via the BS if there is any downlink data to send, again using tunnelling to route the data packets from the NE to the BS. The NE may also send a (separate) acknowledgement to the MD if acknowledged data transmission is required.

The process can be repeated if more data needs to be sent. The BS may cache the NE-routing-info to save the MD from including it in every uplink packet, but in general such caching is avoided in order to avoid the storing context information in the BS.

Figure 5:
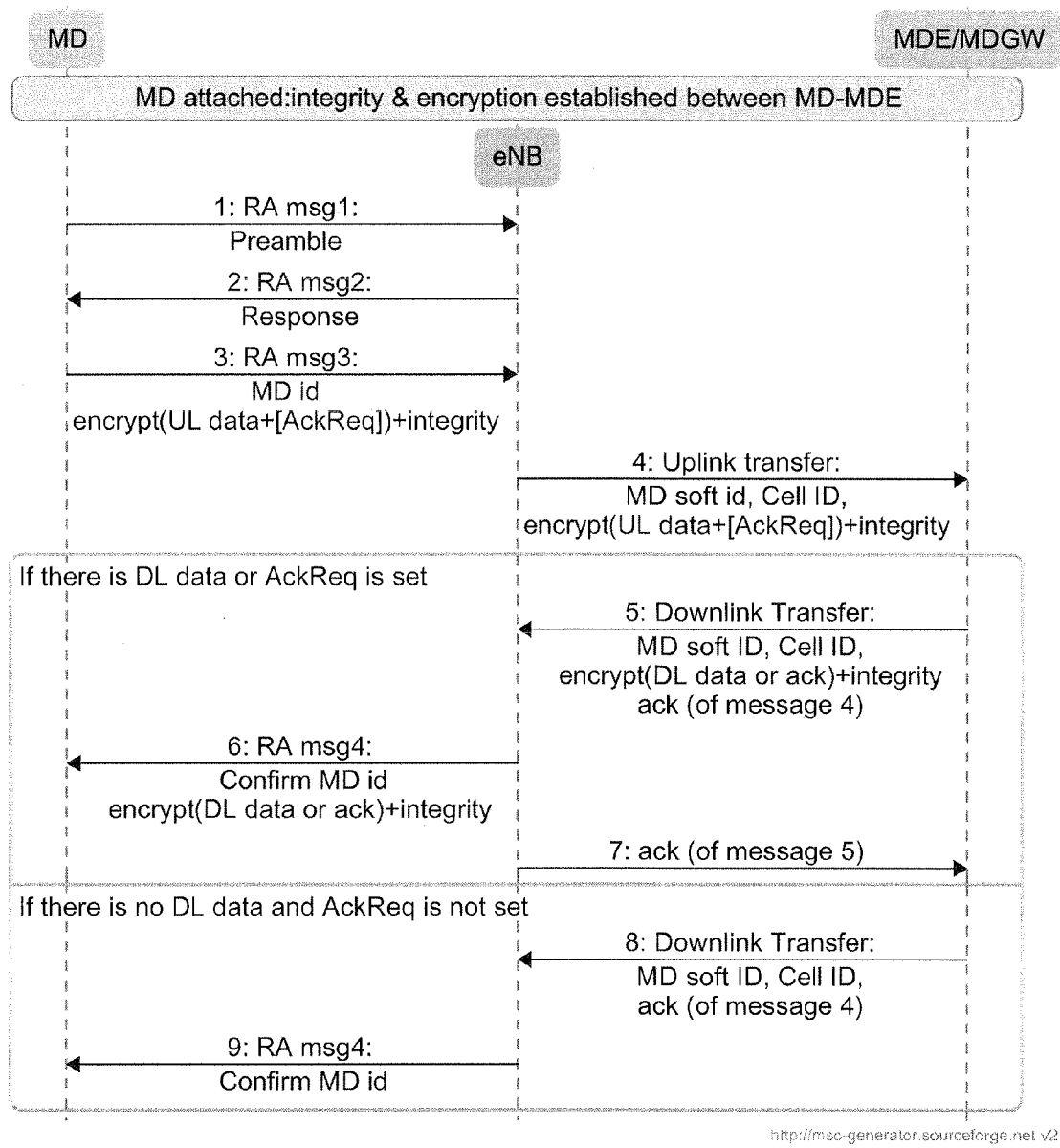
FIG. 5 illustrates in more detail a signalling procedure for enabling a connectionless exchange of data between a Machine Device (MD) and a Network Entity (NE) with a packet core network and relying upon RA signalling to carry user plane data, assuming prior authentication and SA establishment according to FIG. 4.

FIG. 5 illustrates in more detail the signalling flows associated with phases 2 and 3, again taking LTE as an example. The individual signalling steps are as follows:

1. The MD sends Random Access message 1 (preamble).
2. The BS sends Random Access response.
3. The MD identifies itself. [This can be based on the MD Soft ID in the example LTE implementation discussed above, or alternatively on the Short ID if there is a valid Short ID already established between the MD and the eNB using MD-id. If the MD provides the Short ID, the eNB looks up the MD context which also includes the MD Soft ID which is used to identify the MDE as well as the MD towards the MDE.]

Uplink data can be piggybacked and sent in this message. If present, it is encrypted and integrity protected by the MD-NE security association. The integrity protection also covers the MD-id as well as the AckReq. When present, the MD-id is not encrypted so that the NE can use it. The MD should send an AckReq flag to request an integrity acknowledgement with an initial message after mobility to a new BS in order to protect against fake BSs. For a MD which stays at a given BS, it is optional to request an integrity protected acknowledgement, and the MD can periodically set the AckReq flag to make sure that it is talking to the operator via a legal BS, rather than a fake BS which just drops the packets. It is FFS if the AckReq flag is encrypted.

4. The BS determines the destination NE based on the NE identifier encoded into the MD-ID. The BS forwards the uplink data and the AckReq towards the NE which decrypts the data and checks the integrity of the data as well as that of the MD-ID. The Cell ID is sent to the NE to convey the current location information to the NE.

The response from the NE depends on whether there is any data or acknowledgement to be sent to the NE. If there is DL data or AckReq is set, steps 5-7 are performed.

5. The NE responds with any possible downlink data and an acknowledgement. The Ack is always present if the MD sets the AckReq flag. The NE's response is encrypted and integrity protected by the core network security context. This message confirms that the MD-ID and integrity check are validated. The message also carries an acknowledgement towards the BS, as a response to message 4. This message, as well as other NE to BS messages, also carries the Cell ID to allow the BS to identify the current cell.
6. The BS confirms the random access attempt towards the MD by echoing the same MD-ID as in RA message 3. [Considering again the LTE implementation, in case the terminal did not have a Short ID, the random access procedure establishes a new Short ID between the MD and the eNB.]
7. The BS acknowledges message 5 towards the NE. Note that this may be delayed up to a certain extent, to allow the BS to piggyback this with uplink data that may come shortly afterwards.

If there is no DL data and AckReq is not sent, then steps 8 and 9 are performed.

8. This message acknowledges message 4 to the BS.
9. A confirmation is sent to the MD to complete the random access.

After the procedure the NE moves to SINGLE-ROUTE state, i.e. the route to the MN is known, at least until some predefined timeout period expires. (Note that the NE may move to MULTIPLE-ROUTES state later on after a timeout has expired.)

Figure 6:
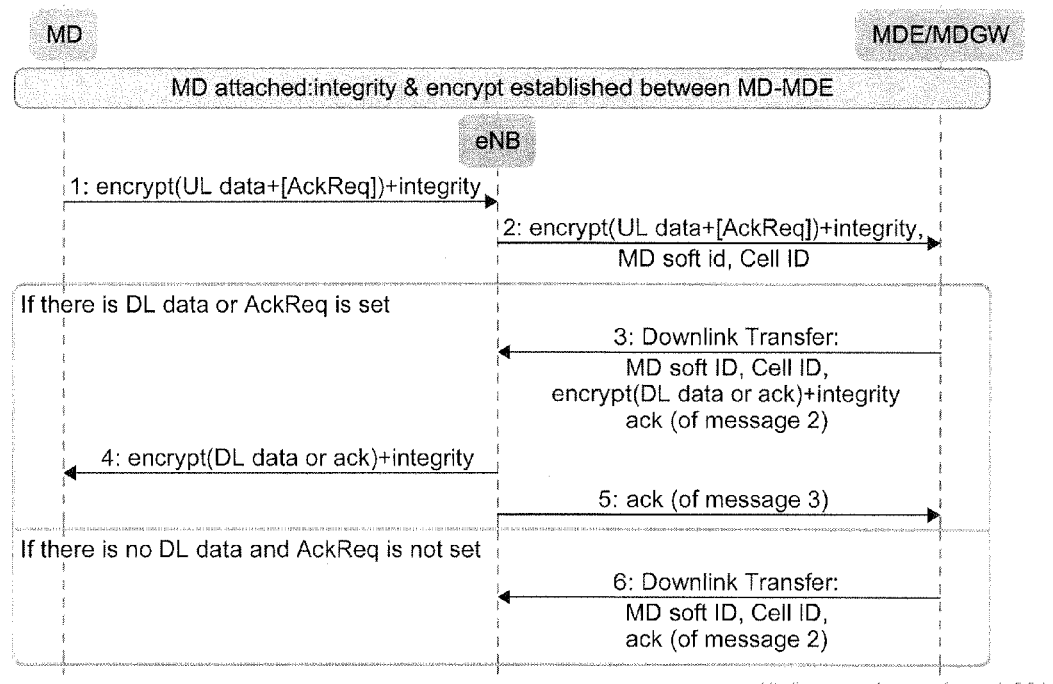
FIG. 6 illustrates in more detail a signalling procedure for enabling a connectionless exchange of data between a Machine Device (MD) and a Network Entity (NE) with a packet core network and relying scheduled signalling to carry user plane data, assuming prior authentication and SA establishment according to FIG. 4

FIG. 6 shows the case of uplink data sent via a scheduled transmission. In this case the identity of the MD is implicitly given by the scheduling grant.

Figure 7:
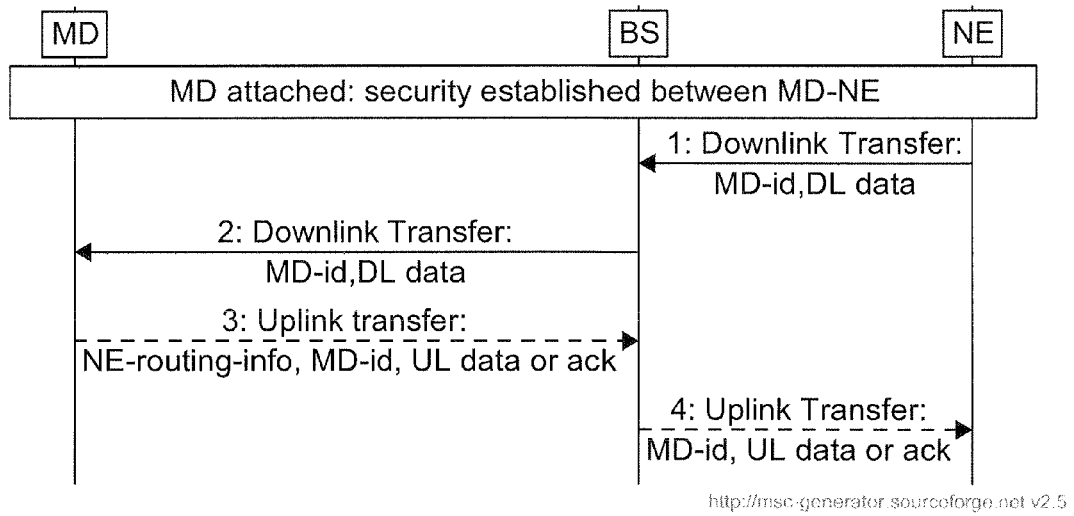
FIG. 7 is a signalling flow for sending unsolicited downlink data to a Machine Device (MD) where the MDs location is known or predicted a priori.

There are cases when the NE has knowledge about the MD's current location, i.e. the BS to which the MD is currently attached. This may be the case when the MD has sent a packet in the uplink direction (either a data packet or in "informational" packet following a handover to a new BS) such that the NE can assume (with high probability) that for a given period of time (timeout) the MD is attached to that same BS. The MD's location may be a best guess. Either way, this will or may allow the NE to send "unsolicited" data to the MD as follows (see FIG. 7):

1. The NE sends the downlink data to the BS where the MD is (assumed) to be located, together with the MD-id. The data is protected by the MD-NE security association.
2. The BS delivers the data to the MD.
3-4: the MD may continue with an uplink transfer in the case that it has some uplink data to send, or if it is required to acknowledge the downlink data.

In case the data cannot be delivered to the MD in step 2 due to failure of the radio link, an error message is sent back to the NE. The NE may try to deliver the data to via an alternative BS (see below).

Figure 8:
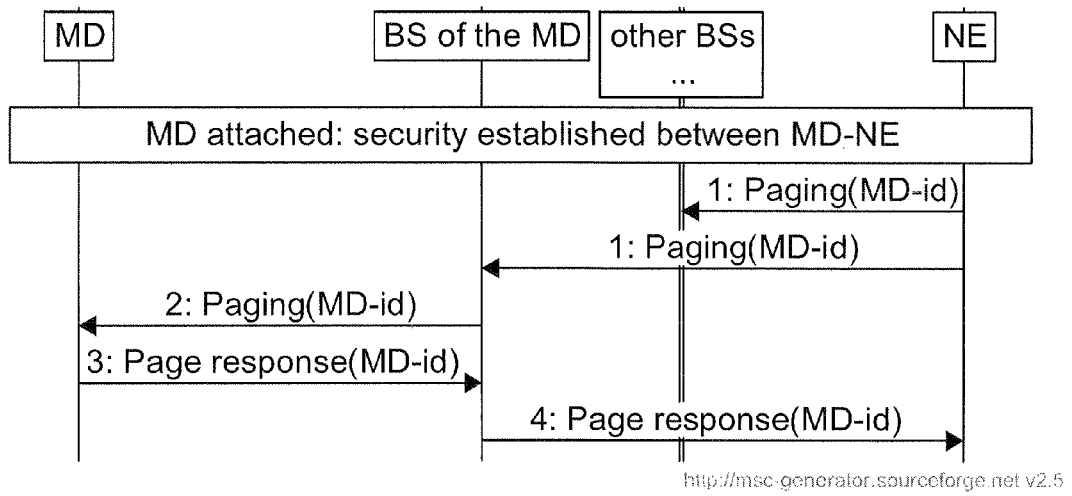
FIG. 8 is a signalling flow for sending unsolicited downlink data to a Machine Device (MD) where the MDs location is unknown a priori, and paging in the RAN is carried out.
Figure 9:
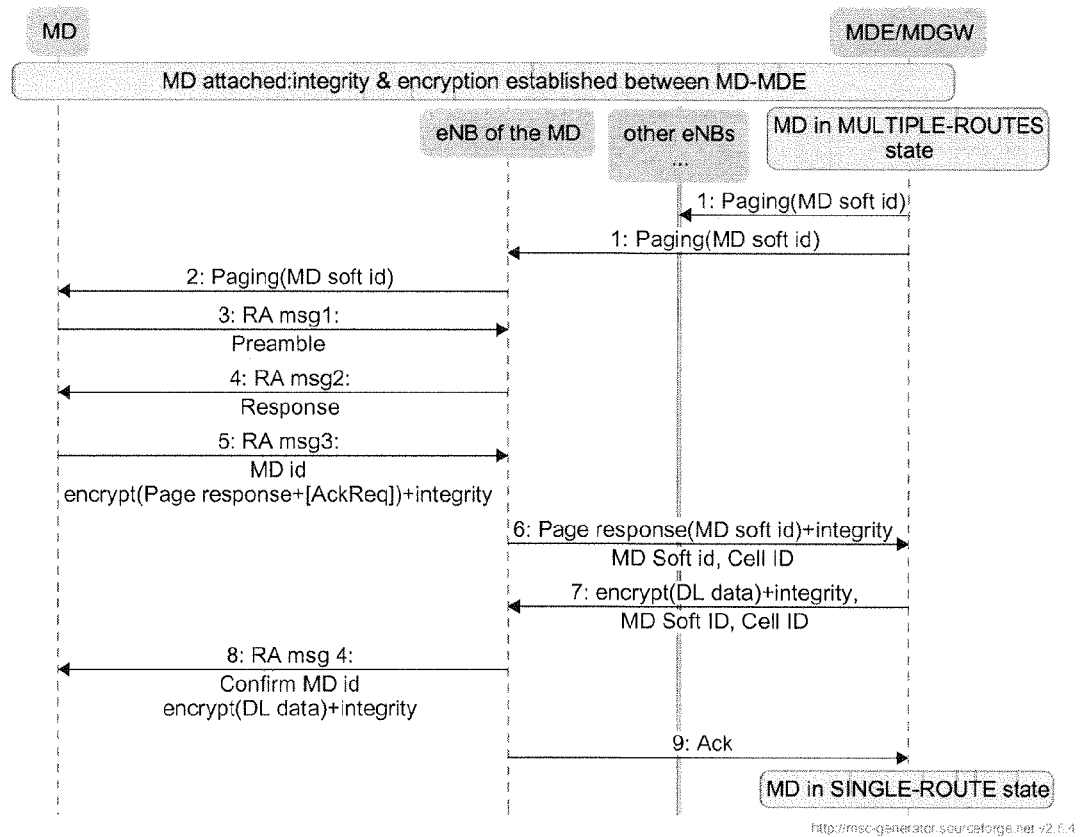
FIG. 9 illustrates the signalling of FIG. 8 in more detail.

In the case that no uplink data or signaling has been received from the MD in a given period of time, or if a previous downlink transmission attempt to the MD failed, the NE can try to deliver the packet via one or more other BSs. To do this, the NE first pages the MD as follows (see FIG. 8 for a general overview, and FIG. 9 for a more detailed consideration in the context of LTE):

1. The NE sends the paging message to the MD's current paging area. The paging area is determined based on the MD's earlier signaling about its location. The BSs may be grouped into Location areas, and the MD may always send signaling when it moves to a new Location area. Alternatively, the NE may send the paging message to the vicinity of the MD's earlier known BSs. This message may optionally include other parameters not shown here, such as a MD specific DRX value.
2. The paging message is delivered to the MD in case it is located at that BS.
3-4. The MD responds with a page response towards the NE. From this point on, the NE can assume the current BS as the most probable location of the MD for a given period of time.

The subsequent delivery of the downlink data can proceed as above, with the BS of the MD assumed as the current location.

It is possible to include the DL data already in step 1. Also, the Page response may carry UL data as an optimization.

Figure 10:
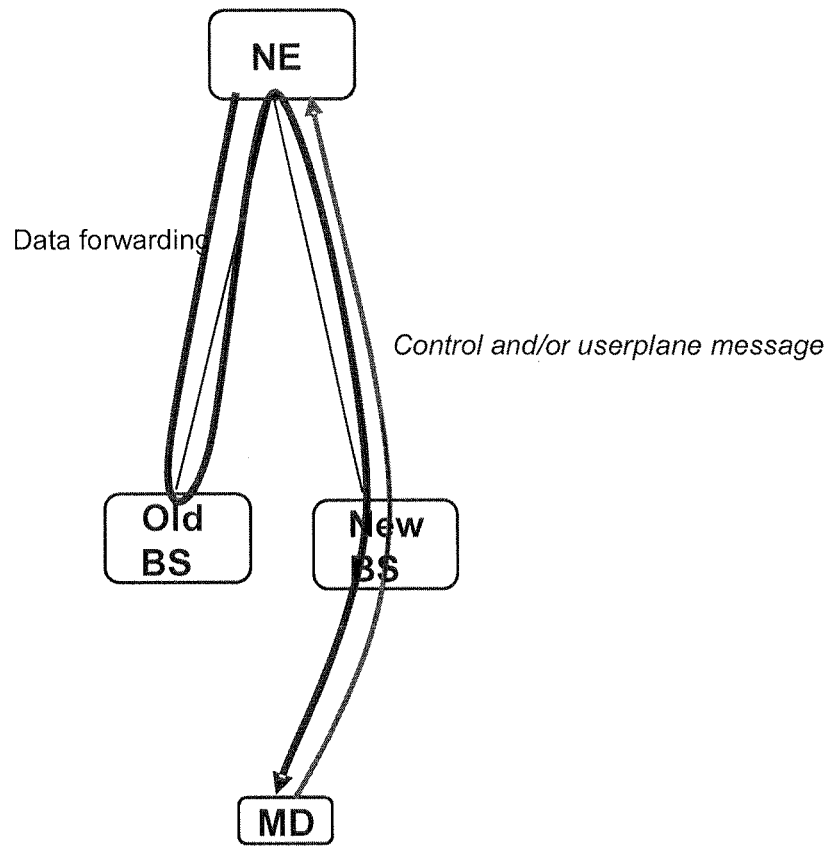
FIG. 10 illustrates the concept of inter-BS mobility.

Based on the connectionless paradigm, the proposed system does not require the maintenance of a state in the BS. This also has the consequence that the mobility of the MD from one BS to another is not based on a network decision, but rather on the MD's autonomous decision. The MD makes its own measurements of the neighbouring base stations, and decides when to move to another base station. (Note that it may be possible for the network operator to download parameters to the MDs to aid the selection of the base stations.) FIG. 10 illustrates in the context of LTE the concept of inter-BS mobility. The Figure shows the case where the MD is not being tracked to a cell or BS granularity, hence the NE does not get an immediate update about the MD's new location.

Figure 11:
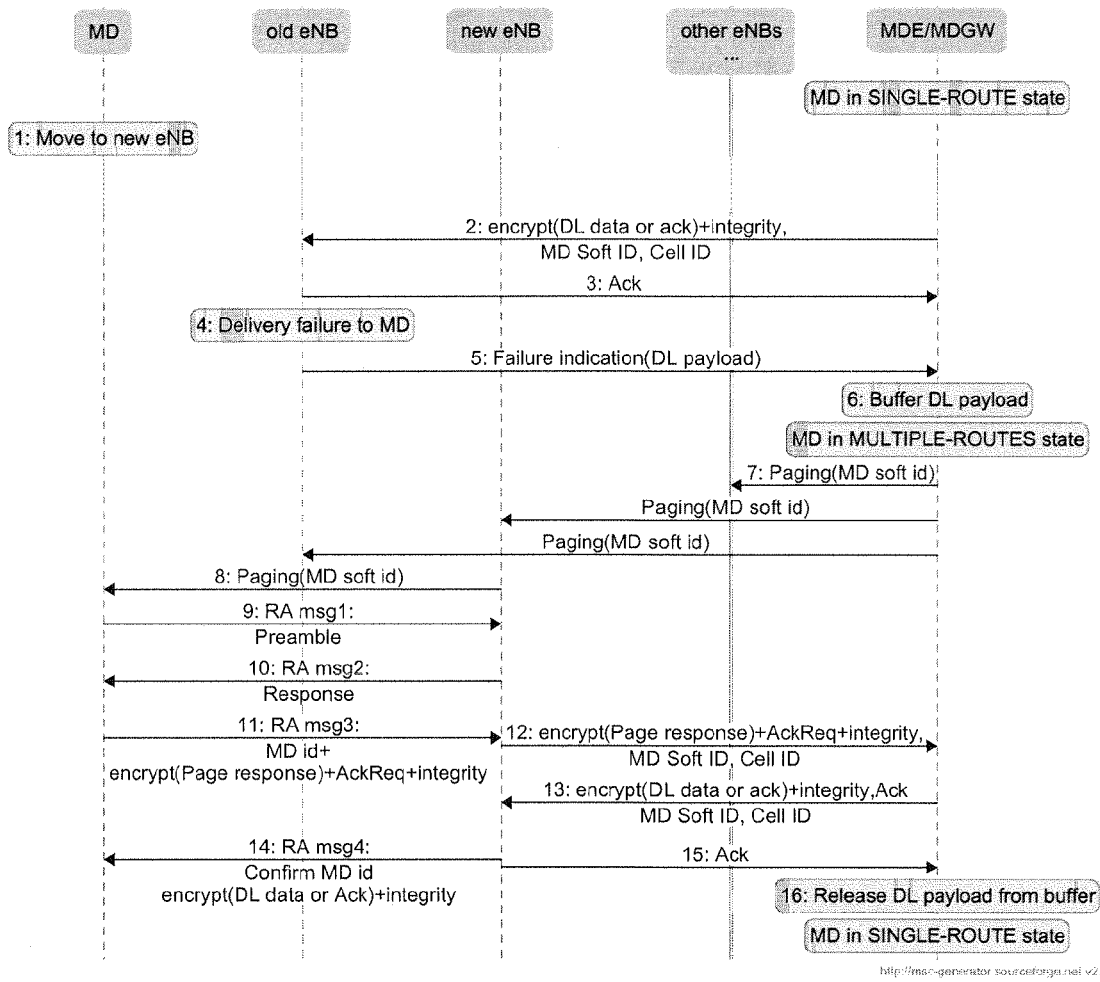
FIG. 11 is a signalling flow associated with the delivery of downlink data to a Machine Device (MD) where the MD is handed over between eNBs of a LTE architecture.

The uplink and downlink communication schemes as described above can be used in this context. Uplink transmission is always possible at any base station without any a priori state set up at that base station, allowing the MD to start with uplink transmission at the new BS without any other signaling. The downlink transmission takes place via that BS that the NE assumes to be the MD's current location. Should the MD move to another BS in the meantime, the NE will get a failure indication from the old BS, and then it can try to deliver the packet in a larger area as described above. Alternatively, the NE may buffer the downlink packet for period of time in case it gets a failure indication from the old BS, and if the MD sends some data or signaling from a new base station it can then deliver the data to that new BS, as illustrated in FIG. 11. This is most useful for highly delay-tolerant data— as is the case for most M2M applications, and in case the MD is configured such that it sends a new location update signaling to the network each time it moves to a new BS.

Figure 12:
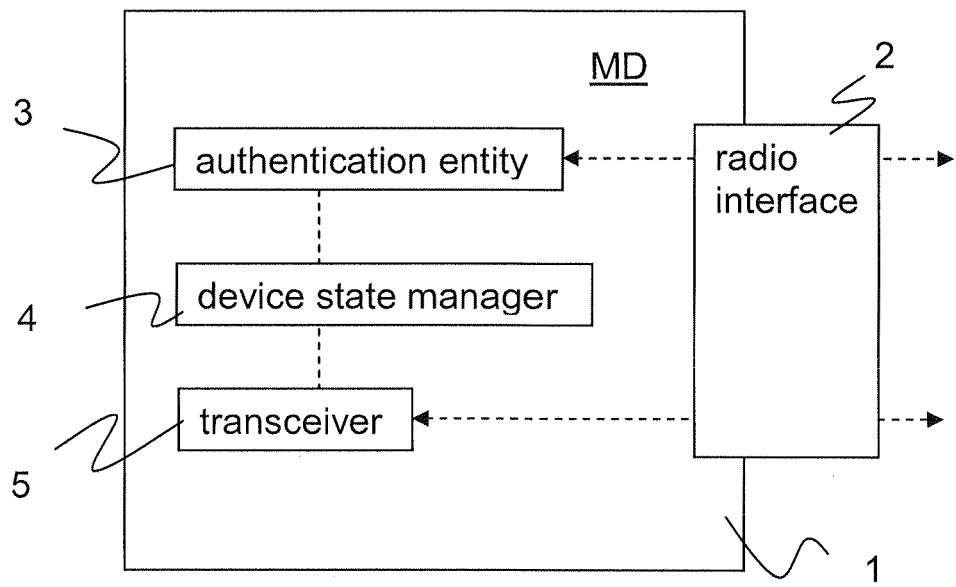
FIG. 12 illustrates schematically a Machine Device (MD) configured to implement a lightweight data transmission procedure.

FIG. 12 illustrates schematically a user device (MD) 1 for exchanging data with a network entity within a packet core network via a radio access network. The device comprises hardware (including memory) and software for implementing functionality including a standard radio interface 2 (e.g. UTRAN, eUTRAN, etc). The user device comprises an authentication entity 3 for authenticating the user device to the network entity and for establishing a Security Association with the network entity. A device state manager 4 maintains the user device in a connectionless state, such that no Security Association is established between the user device and the radio access network and no data bearer is set up between the user device and said packet core network. A transceiver 5 is provided for exchanging uplink and downlink user plane data with said network entity when the user device is in said connectionless state by sending and receiving the data within signalling messages on the Non Access Stratum.

Figure 13:
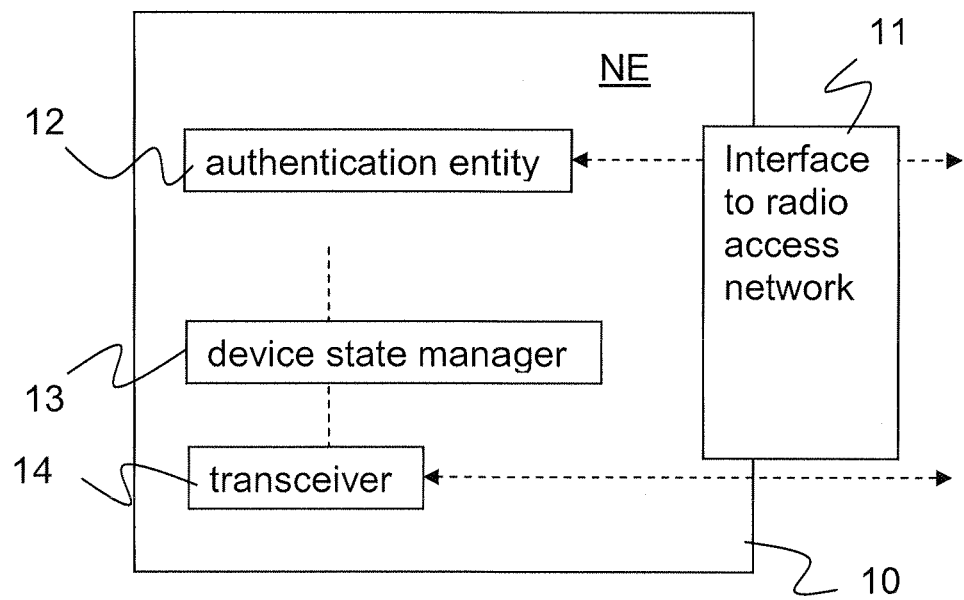
FIG. 13 illustrates schematically a Network Entity (NE) configured to implement a lightweight data transmission procedure.

FIG. 13 illustrates schematically a Network Entity (NE) 10 for use within a packet core network and being configured to exchange data with a user device via a radio access network. The NE comprises hardware (including memory) and software for implementing a standard interface 11 towards a base station (e.g. eNB etc) of a radio access network. The NE comprises an authentication entity 12 for authenticating a user device and for establishing a Security Association with the user device. A device state manager 13 is provided for maintaining the user device in a connectionless state, such that no Security Association is established between the user device and the radio access network and no data bearer is set up between the user device and said packet core network. A transceiver 14 is provided for exchanging uplink and downlink user plane data with said user device when the user device is in said connectionless state by sending and receiving the data within signalling messages on the Non Access Stratum.

Figure 14:
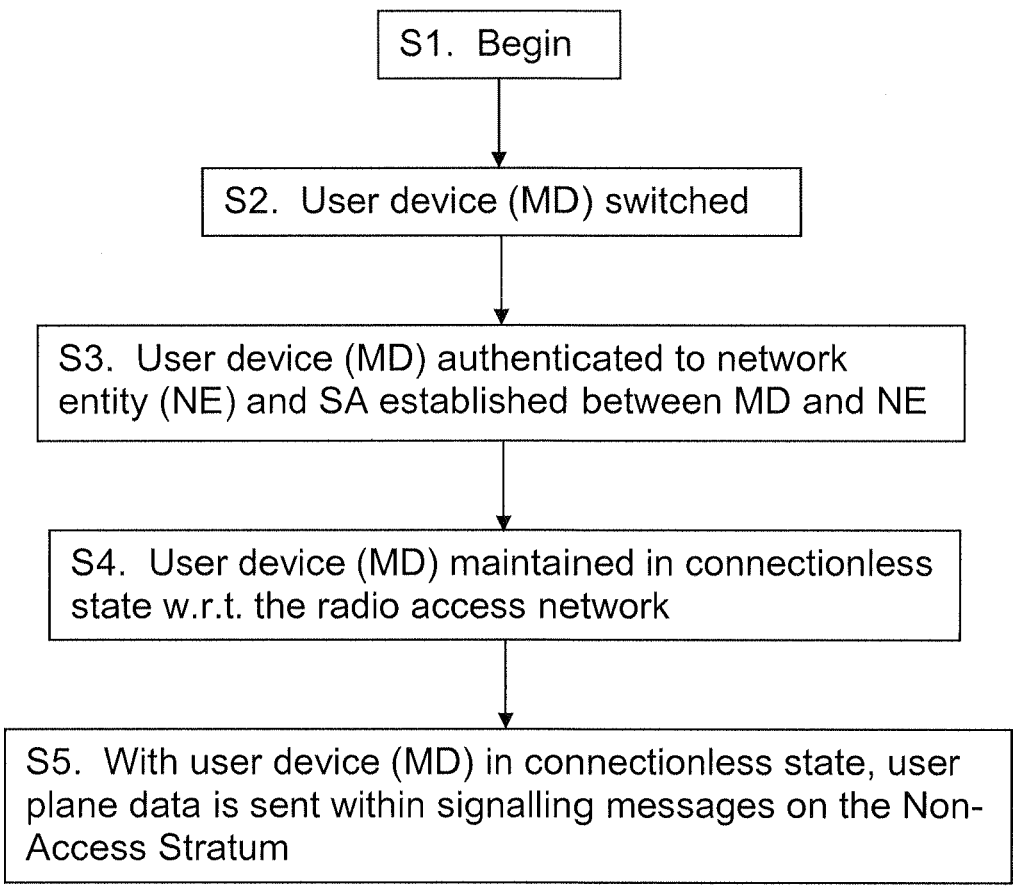
FIG. 14 is a flow diagram lightweight data transmission procedure.

FIG. 14 is a flow diagram further illustrating a procedure for allowing a connectionless exchange of user plane data between the MD and the NE. The procedure begins at S1, and at step S2 the MD is switched on. Step S3 shows the step of authenticating the MD to the NE within the PS core, and establishing a SA between the two entities. This may involve the NE interacting with a an authentication server such as the HSS. At step S4, the MD is maintained in a connectionless state with respect to the radio access network, i.e. no state is maintained within the RAN for the MD. At step S5, the MD is able to send user plane data to the NE using signalling in the NAS, and is similarly able to receive data from the NE.

As noted above, the proposed scheme is connectionless in the sense that it does not require the maintenance of a state in the BS. This applies in particular to the security context in the BS, since encryption and integrity protection takes place between the MD and the NE, transparent to the BS. In arriving at this determination, the following points have been considered:

In the proposed model, mobility/cell change is MD controlled rather than network (BS) controlled. This means that there is no handover signalling to protect.

From this, it also follows that radio measurement reporting of other BSs from the MD to the BS can be avoided. Hence this type of signaling does not require protection and there is no need for a BS security context for this.

For machine devices, the concept of dynamic allocation of multiple radio bearers appears unnecessary, as the MDs can typically use only static QoS settings, and a single type of QoS. Hence there is no need for the associated bearer setup/release signaling, and this also does not require protection.

RLC (Radio Link Control) and HARQ (Hybrid Automatic Repeat Request) are unprotected even in today's LTE and also does not require protection in a M2M environment. Likewise, setting a few other parameters of the radio link (e.g., modulation mode) can be done without extra cryptographic protection.

The proposed system architecture is a connectionless mobile system in the sense that it does not require the maintenance of a state in the RAN, however it does not exclude the possibility of some RAN state for optimization purposes, such as a temporary short identifier, or state concerning the MD's radio link quality. The proposed system is optimized for M2M applications and brings the following advantages.

It avoids the maintenance of excessive numbers of contexts in the RAN for small devices.

It reduces the signaling overhead for both the MD and the network entities, by piggybacking control and data on the same messages.

By reducing the communication overhead, the power consumption of the MD may be decreased.

It enables a network architecture with a combined entity for control and signaling, thus potentially reducing network complexity for M2M applications.

The system has the disadvantage that it may be less optimized for delay and high throughput. However, the overhead reduction is much more important for M2M applications, which are typically not delay sensitive, and also do not depend on high throughput.

The proposed system can be deployed in harmony with existing 3GPP mobile systems. With respect to LTE access, the NE corresponds to a combination of the MME-like and the SGW-like functionality as it processes both control and data. The NE could be implemented both as a standalone node, or as a function of an existing node such as an MME.

It will be appreciated by the person of skill in the art that various modifications may be made to the above described embodiments without departing from the scope of the present invention.

The invention claimed is:

1. A method of sending user plane data between a user device and a network entity within a packet core network via a radio access network, the method comprising:
   1) authenticating the user device to the network entity and establishing a Security Association between the user device and the network entity;
   2) maintaining the user device in a connectionless state, such that no Security Association is established between the user device and the radio access network and no data bearer is set up between the user device and said packet core network;
   3) with the user device in said connectionless state, sending uplink and downlink user plane data between the user device and said network entity by including the data within encrypted, protocol layer 2 signalling messages on Non Access Stratum functionality operating between the user device and the network entity within the packet core network;
   4) storing, at said network entity, an identity of a base station within the radio access network following receipt by network entity of a protocol layer 2 signalling message from said user device; and
   5) using that identity to determine a routing path for a subsequent signalling message destined for that user device.

2. A method according to claim 1, wherein said packet core network is an Evolved Packet Core network.

3. A method according to claim 2, wherein said radio access network is a Long Term Evolution network or an enhanced UMTS Terrestrial Radio Access Network (UTRAN).

4. A method according to claim 3, wherein step 3) comprises including uplink and downlink data within protocol layer 2 Random Access messages sent between the user device and the radio access network.

5. A method according to claim 3, wherein step 3) comprises including uplink and downlink data within scheduled protocol layer 2 signalling messages on the Non Access Stratum.

6. A method according to claim 2, wherein said network entity implements a Mobility Management Entity function.

7. A method according to claim 6, wherein said network entity further implements a Serving Gateway function.

8. A method according to claim 1 and comprising, for uplink data, including within a protocol layer 2 signalling message containing user plane data, routing information for said network entity, and using the routing information within the radio access network to route the user plane data to the network entity.

9. A method according to claim 8 and comprising, for uplink data, including within a protocol layer 2 signalling message containing user plane data, an identity of the user device.

10. A method according to claim 1 and comprising, for downlink data, including within a protocol layer 2 signalling message containing user plane data, an identity of the user device, and using that identity within the radio access network to route the user plane data to the user device.

11. A method according to claim 1 and comprising, in the event that no base station identity is stored at the network entity in respect of the user device, or in the event of a failure to deliver a signalling message using a stored base station identity, performing a paging operation in the radio access network to identify a base station and reporting this identity to the network entity.

12. A method according to claim 1 and comprising, in the event that no base station identity is stored at the network entity in respect of the user device, or in the event of a failure to deliver a signalling message using a stored base station identity, storing the downlink user plane data until such time as a signalling message is received from the user device and the identity of the base station is known.

13. A method according to claim 1, further comprising encrypting user plane data for inclusion in a protocol layer 2 signalling message or including integrity protection in a protocol layer 2 signalling message, at the network entity and the user device.

14. A user device for exchanging data with a network entity within a packet core network via a radio access network, the user device comprising:
  an authentication entity, including one or more data processors, configured to authenticate the user device to the network entity and establish a Security Association with the network entity;
  a device state manager, including one or more data processors, configured to maintain the user device in a connectionless state such that no Security Association is established between the user device and the radio access network and no data bearer is set up between the user device and said packet core network; and
  a transceiver for exchanging uplink and downlink user plane data with said network entity when the user device is in said connectionless state by sending and receiving the data within encrypted, protocol layer 2 signalling messages on Non Access Stratum functionality operating between the user device and the network entity within the packet core network,
  wherein the transceiver is filthier configured to send to the network entity an identity of a base station within the radio access network in a protocol layer 2 signalling message for the network entity to use the identity to determine a routing path for a subsequent signalling message destined for the user device.

15. A user device according to claim 14, the device being configured to communicate with an enhanced UMTS Terrestrial Radio Access Network.

16. A user device according to claim 15, said transceiver being configured to include within uplink protocol layer 2 signalling messages containing user plane data, an identity of the user device and, optionally, an identity or other routing information for said network entity.

17. A network entity for use within a packet core network and being configured to exchange data with a user device via a radio access network, the network entity comprising:
  an authentication entity, including one or more data processors, configured to authenticate the user device and establish a Security Association with the user device;
  a device state manager, including one or more data processors, configured to maintain the user device in a connectionless state such that no Security Association is established between the user device and the radio access network and no data bearer is set up between the user device and said packet core network;
  a transceiver for exchanging uplink and downlink user plane data with said user device when the user device is in said connectionless state by sending and receiving the data within encrypted, protocol layer 2 signalling messages on Non Access Stratum functionality operating between the user device and the network entity within the packet core network; and
  a signalling message routing controller configured to store an identity of a base station within the radio access network following receipt by the network entity of a protocol layer 2 signalling message from the user device and to use that identity to determine a routing path for a subsequent signalling message destined for that user device.

18. A network entity according to claim 17, wherein said network entity is configured to operate within an Evolved Packet Core network.

19. A network entity according to claim 18, the network entity implementing a Mobility Management Entity function.

20. A network entity according to claim 19, the network entity further implementing a Serving Gateway function.

21. A network entity according to claim 17, said signalling message routing controller being configured, in the event that no base station identity is stored at the network entity in respect of the user device, or in the event of a failure to deliver a signalling message using a stored base station identity, to initiate a paging operation in the radio access network to identify a base station.

22. A network entity according to claim 17, said signalling message routing controller being configured, in the event that no base station identity is stored at the network entity in respect of the user device, or in the event of a failure to deliver a signalling message using a stored base station identity, to store the downlink user plane data until such time as a signalling message is received from the user device and the identity of the base station is known.

* * * * *

UNITED STATES PATENT AND TRADEMARK OFFICE
CERTIFICATE OF CORRECTION

| | | |
|---|---|---|
| PATENT NO. | : 8,848,610 B2 | Page 1 of 1 |
| APPLICATION NO. | : 13/264496 | |
| DATED | : September 30, 2014 | |
| INVENTOR(S) | : Miklos et al. | |

It is certified that error appears in the above-identified patent and that said Letters Patent is hereby corrected as shown below:

On Title Page 2, in item (56), under "OTHER PUBLICATIONS", in Column 1, Line 2, delete "Un-Peet2Peer" and insert -- Un-Peer2Peer --, therefor.

In the Specification

In Column 1, Lines 35-36, delete "Telefoneaktiebolaget" and insert -- Telefonaktiebolaget --, therefor.

In Column 2, Line 43, delete "comprises" and insert -- comprises: --, therefor.

In Column 3, Line 44, delete "FIG. 4" and insert -- FIG. 4; --, therefor.

In Column 9, Line 22, delete "a an" and insert -- an --, therefor.

In the Claims

In Column 10, Line 59, in Claim 5, delete "on the" and insert -- on --, therefor.

In Column 11, Line 52, in Claim 14, delete "filthier" and insert -- further --, therefor.

Signed and Sealed this
Second Day of June, 2015

Michelle K. Lee
*Director of the United States Patent and Trademark Office*